UNITED STATES PATENT OFFICE.

ERNST ULRICHS, OF ELBERFELD, GERMANY, ASSIGNOR TO THE FIRM OF WÜLFING, DAHL & CO. ACTIENGESELLSCHAFT, OF BARMEN, GERMANY.

PROCESS OF MAKING LAKES.

No. 890,254.　　　Specification of Letters Patent.　　　Patented June 9, 1908.

Application filed September 4, 1907. Serial No. 391,355.

*To all whom it may concern:*

Be it known that I, ERNST ULRICHS, a subject of the King of Prussia, German Emperor, and resident of Alter Markt, Elberfeld, Province of the Rhine, German Empire, have invented certain new and useful Improvements in Processes of Making Lakes, of which the following is an exact specification.

This invention relates to a process for manufacturing lakes from azo-dye-stuffs containing sulfo-groups. In the pigment industry it is usual to supply in a chemically pure state chrome-yellow, chrome and zinc green and so on to countries in which the said products are liable to a high duty even in a diluted state. These chemically pure colors are then ground by small manufacturers with heavy spar, gypsum etc. in grinders or ball mills and in this way given the usual commercial form. It is evident that if the lake precipitated and dried without a substratum could be subjected to further treatment in a similar way, this would be a considerable simplification of the lake manufacture. The disadvantage of manufacturing lakes in that way, is that some lakes, for instance those of the eosin series, become duller by long grinding. Nevertheless it is known that a series of lakes, for instance lithol or lake-red, require a longer and sharper grinding before the greatest intensity of color is reached. A known process for manufacturing lakes is one in which, for instance, the dried azo-dye-stuff forming the basis of the lithol-red, is converted by grinding with heavy spar and solution of barium chlorid, into a lake. Of course, a lake obtained in that way has to be subsequently dried once more. Moreover such grinding in the moist state requires a great deal of power. Further during the reaction with metal salts, common salt gets into the lake as an impurity.

Experiments made on the basis of the above considerations have given the following results. Basic dyes like auramin, brilliant green, fuchsin etc. preferably precipitated with tannin, as well as derivates of triphenyl methane and eosins which can be precipitated with salts of lead, or acid green, acid violet, patent blue etc. precipitated with barium chlorid, give unsatisfactory results. It has been on the contrary, found that metal salts of azo-colors, chiefly those containing only one sulfo-group, can be treated dry with substrata and converted into ordinary paint colors for wall papers, printing and lithographic ink and the like. The substratum in question must not be, however, added at once in grinding to the dry metal salt of the azo-dye, but it is preferable to add it gradually after the part already added, has been thoroughly mixed with the metal salt by grinding. More particularly in the case of lakes containing only a small percentage of dry metal salt, this course must be followed because, if the whole quantity of substratum were added at once, the grinding would take too much time. A few examples will illustrate the process.

*Example 1—Colors for wall papers.*—10 kg. orange II B are dissolved boiling in about 500 liters of water and converted into an insoluble salt of barium with a solution of 5 kg. barium chlorid. The precipitate is filtered off and dried, and then ground with 100 kg. of finely ground gypsum which is added in a gradual manner.

*Example 2—Oil paint for painters.*—30 kg. of salt of sodium of the dye from 2.1 naphthylamin-sulfo-acid and beta naphthol in paste, are boiled for a few minutes with a solution of 5 kg. of barium chlorid. The barium salt produced is filtered off and dried and then ground with 100 kg. heavy spar which is added in a gradual manner. In that way the same shade is produced as when manufacturing the lake in accordance with previously known processes.

*Example 3—Printing and lithographic ink.*—100 kg. of lake red P are treated with the solution of 20 kg. barium chlorid, after the reaction the paint is filtered off and dried, and then ground with 50 kg. of dry hydrate of alumina.

The advantages of the new process are as follows:—

1. In case tar color manufacturers bring on the market the insoluble metal salts of azo-colors, the lake manufacturers need not precipitate and dry the lake.

2. It is quite impossible that a parcel of color should come out wrong, which hitherto has been the case, when, for instance, heavy spar contains gypsum, lime etc. as impurities.

3. During dry grinding substrata can be used, which it is otherwise impossible to use, thus, for instance, the cheap gypsum cannot be very well used in precipitating azo-colors with barium chlorid as of course it would entirely or partly form fixed white with chlorid of barium.

4. As the salts of alkaline earths or heavy metals of the azo-colors when pressed out, hold less water than the specifically lighter salts of sodium, less water will have to be evaporated in drying and thus the drying process is rendered cheaper.

5. Dealers in colors, manufacturers of wall papers, aluminum dyes, pastel pencils, printers and lithographers, large firms of painters etc., who do not possess any precipitating vats, filters, presses, drying installations etc. but have available mechanical power, can manufacture lakes themselves by grinding metal salts with substrata such as heavy spar, gypsum, kaolin, lithopone, minium, etc.

Having thus fully described the nature of my invention, what I desire to secure by Letters Patent of the United States is:—

1. Process of manufacturing lakes which consists in forming the mixture of the dry alkaline earth or heavy metal salts of azo colors containing one or more sulfo-groups with a substrata and grinding the same in a dry state.

2. A process for making lakes which consists in taking the dry alkaline earths or heavy metal salts of azo-color containing one or more sulfo-groups adding thereto gradually a substrata while grinding the mixture in the dry state.

In witness whereof I have hereunto set my hand in the presence of two witnesses.

ERNST ULRICHS.

Witnesses:
WILLIAM MAYNER,
HENRY HASPER.